United States Patent
Bao

(10) Patent No.: US 9,998,601 B2
(45) Date of Patent: Jun. 12, 2018

(54) DYNAMICALLY CONFIGURING INTERACTIVE VOICE RESPONSE CALL TREES

(71) Applicant: Verizon Patent and Licensing Inc., Arlington, VA (US)

(72) Inventor: Guanqun Bao, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 245 days.

(21) Appl. No.: 15/141,086

(22) Filed: Apr. 28, 2016

(65) Prior Publication Data

US 2017/0318156 A1    Nov. 2, 2017

(51) Int. Cl.
- *H04M 3/527* (2006.01)
- *H04M 1/247* (2006.01)
- *H04M 1/725* (2006.01)
- *H04W 12/08* (2009.01)

(52) U.S. Cl.
CPC ......... *H04M 3/527* (2013.01); *H04M 1/2478* (2013.01); *H04M 1/72525* (2013.01); *H04W 4/60* (2018.02); *H04W 12/08* (2013.01)

(58) Field of Classification Search
CPC ............... H04M 3/527; H04M 1/2478; H04M 1/72525; H04W 12/08; H04W 4/60
See application file for complete search history.

(56) References Cited

U.S. PATENT DOCUMENTS

| | | | | |
|---|---|---|---|---|
| 5,912,952 A * | 6/1999 | Brendzel | ............... | H04M 3/493 379/93.17 |
| 7,130,391 B2 * | 10/2006 | Janakiraman | ..... | H04M 1/72563 379/88.17 |
| 7,783,305 B2 * | 8/2010 | Ross | .................... | H04M 3/4936 340/426.18 |
| 9,900,433 B1 * | 2/2018 | Helbert | ............... | H04M 3/5166 |
| 2006/0285657 A1 * | 12/2006 | Lippke | .................. | H04M 3/493 379/67.1 |
| 2008/0165948 A1 * | 7/2008 | Ryals | .................... | H04M 3/436 379/266.1 |
| 2009/0141880 A1 * | 6/2009 | Kumhyr | .............. | H04M 3/4938 379/201.02 |
| 2015/0094036 A1 * | 4/2015 | Lee | ....................... | H04M 3/493 455/414.1 |

* cited by examiner

*Primary Examiner* — Lisa Hashem

(57) ABSTRACT

A device may receive, from an interactive voice response (IVR) device, a first request for a code. The first request may be based on the IVR device having received a call from a user device. The device may determine user device information, associated with the user device, based on the first request. The device may determine the code based on at least one of the first request or the user device information. The device may send, to the IVR device, the code to enable the IVR device to configure a call tree based on the code. The device may receive, from the IVR device, a second request for an experience. The experience may be based on the code. The device may send, to the user device, a message to cause the user device to provide the experience.

20 Claims, 5 Drawing Sheets

100

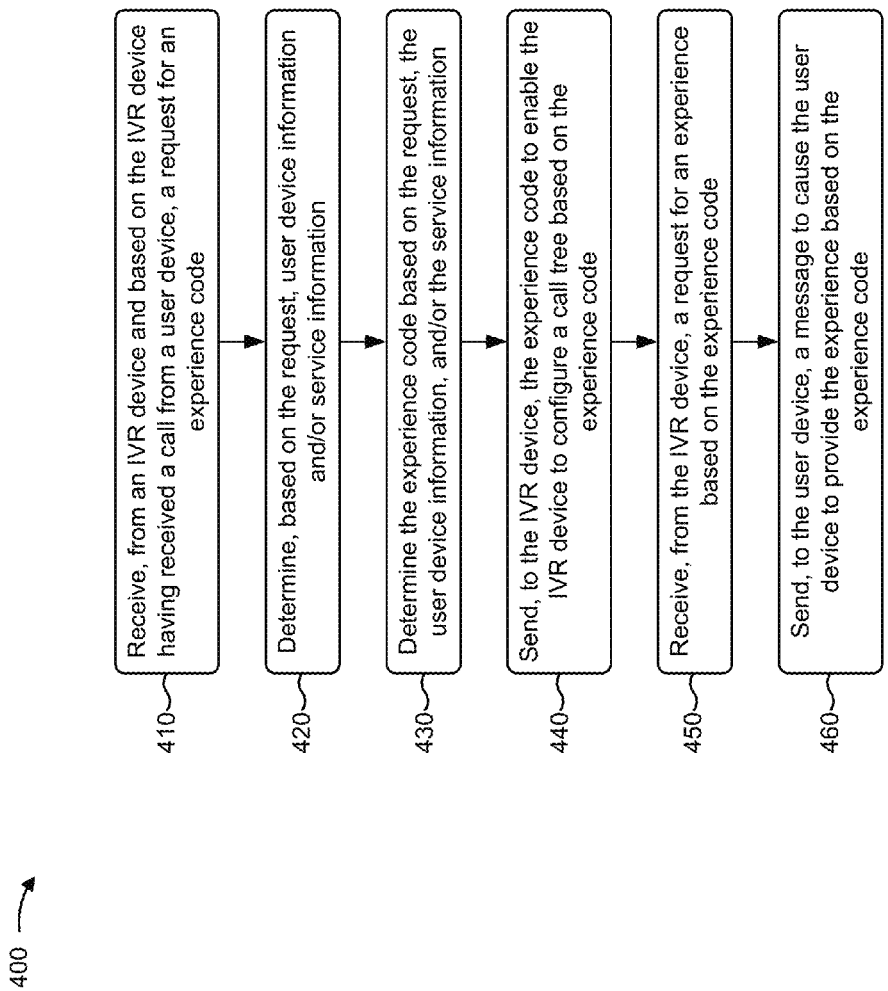

DYNAMICALLY CONFIGURING INTERACTIVE VOICE RESPONSE CALL TREES

BACKGROUND

An interactive voice response (IVR) system may interpret a human caller's response to voice prompts through use of speech recognition and/or dual-tone multi-frequency (DTMF) decoding of tones input via a telephone keypad. IVR systems may allow a caller to service the caller's inquiries by following and responding to a dialogue provided by the IVR system. The dialogue may be based on an IVR call tree.

BRIEF DESCRIPTION OF THE DRAWINGS

FIG. 4 is a flow chart of an example process for dynamically configuring IVR call trees.

DETAILED DESCRIPTION OF PREFERRED EMBODIMENTS

The following detailed description of example implementations refers to the accompanying drawings. The same reference numbers in different drawings may identify the same or similar elements.

Although various user devices may have differing capabilities (e.g., with regard to Internet access, applications, or the like), an IVR system may provide static call trees that may not change based on the capabilities of a user device that has called the IVR system. Thus, even though a user device might be able to access the Internet and/or obtain and run applications, an IVR system may still only provide a fixed set of options to a caller (e.g., to select and hear prerecorded information, connect to a human representative, or the like). Implementations described herein may enable dynamically configuring IVR call trees (e.g., by adding options to open a web page, use an application, or the like) based on the capabilities of the user device that called the IVR system.

Figure 1A:
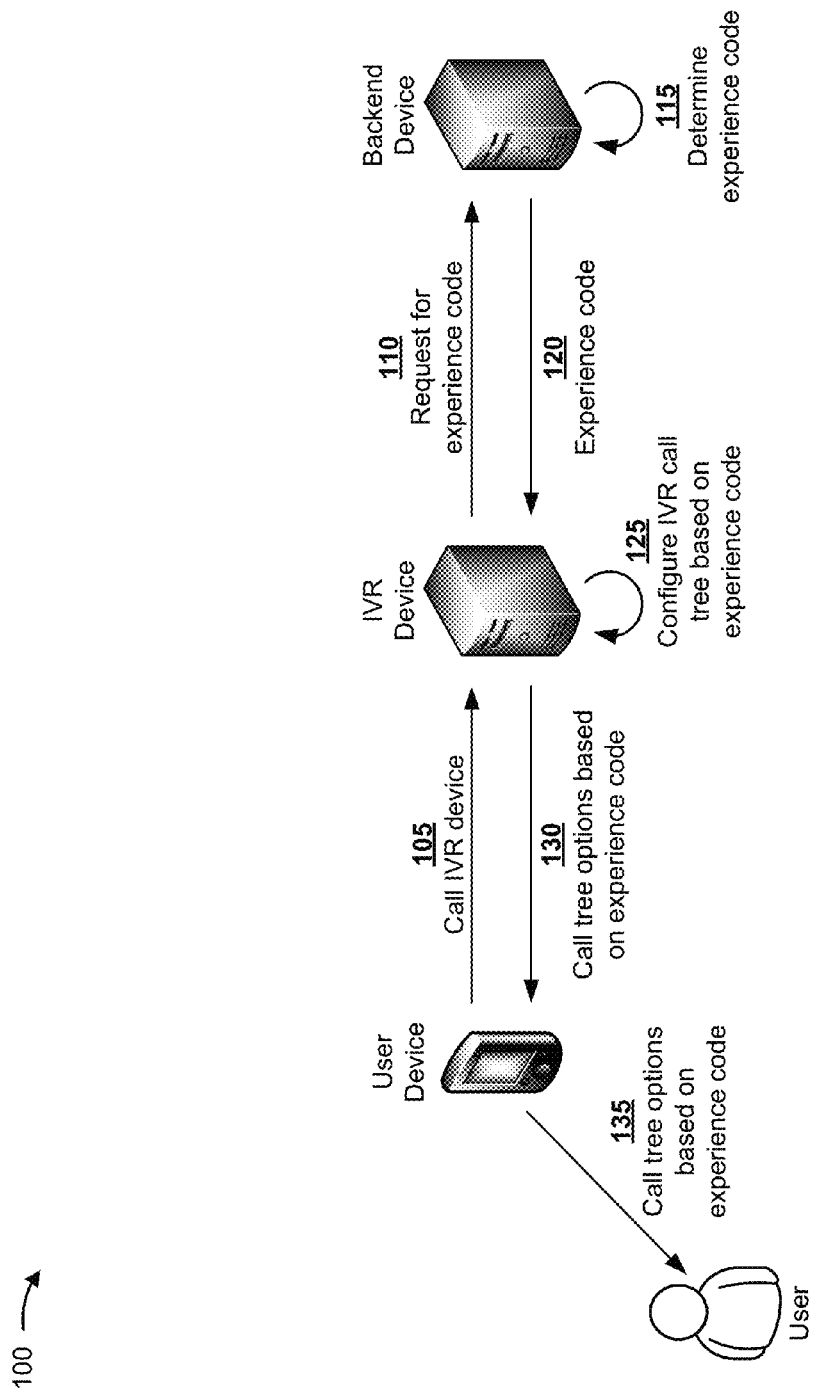
FIGS. 1A and 1B are diagrams of an overview of an example implementation described herein.
Figure 1B:
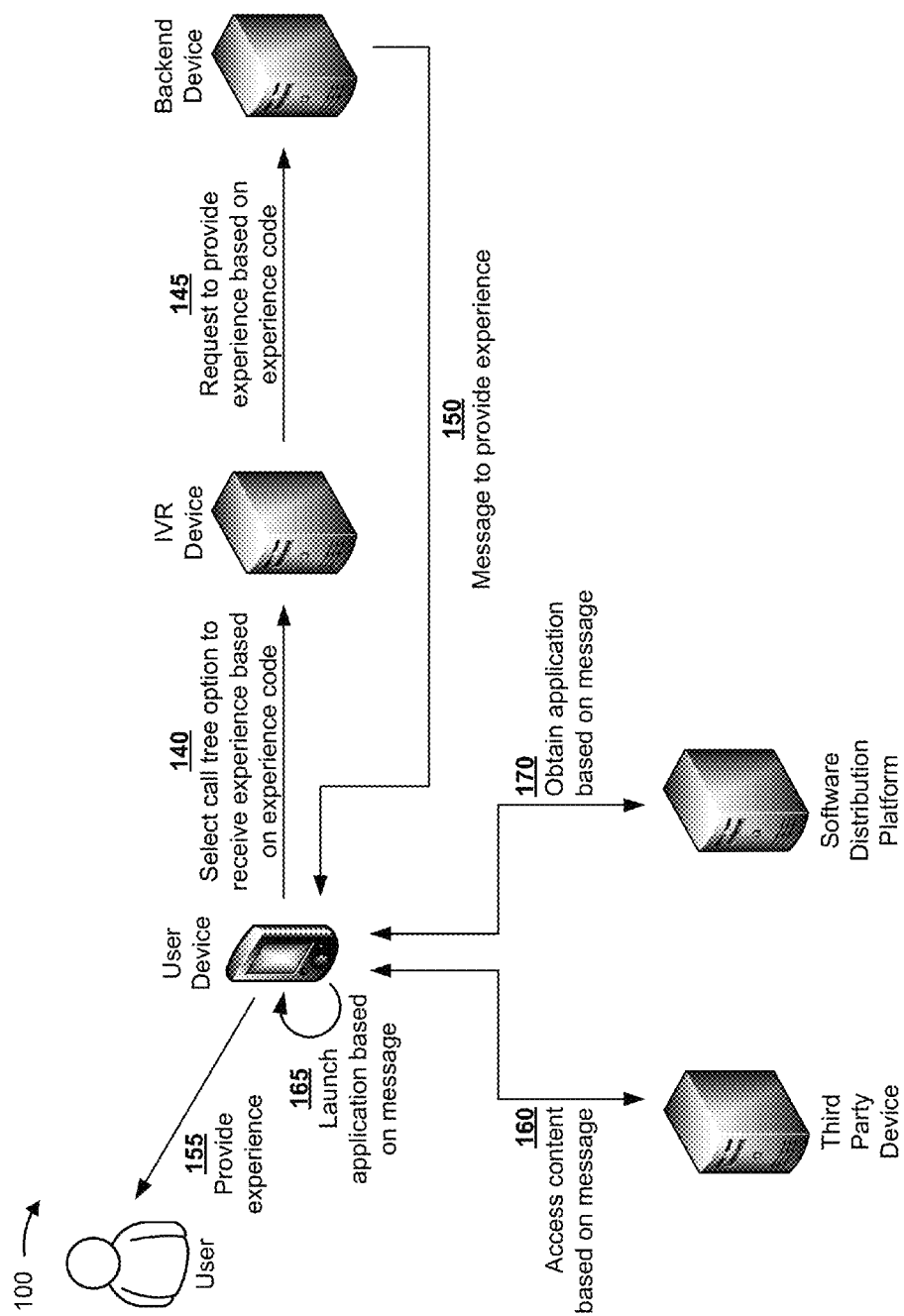

FIGS. 1A and 1B are diagrams of an overview of an example implementation 100 described herein. As shown in FIG. 1A, and by reference number 105, assume that a user has used a user device (e.g., a mobile device, such as a smart phone or the like) to call a phone number (e.g., a toll-free customer-service number or the like) that is associated with an IVR system (e.g., an IVR device). Further assume that the user device is capable of connecting to the Internet and/or running an application (e.g., a mobile app).

As shown in FIG. 1A, and by reference number 110, the IVR device may send, to a backend device, a request for an experience code. The IVR device may send the request for the experience code based on the IVR device having received the call from the user device. As shown by reference number 115, and based on receiving the request for the experience code, the backend device may determine an experience code (e.g., a suitable character string that may be used to identify an experience that the IVR device may offer (e.g., in a call tree) and/or that the backend device may cause the user device to provide). The backend device may determine the experience code based on information about the user device (e.g., the user device's operating system (OS) and/or device type) and/or based on information regarding available experiences. In some implementations, available experiences may include a static IVR call tree experience, a web-based experience, an application-based experience, or the like. A static IVR call tree experience may include a tree of menus and/or options (e.g., to select and hear prerecorded information, connect to a human representative, or the like) that are presented to a user during a call to the IVR device. A web-based experience may include opening a web page on the user device. An application-based experience may include using an application on the user device.

As further shown in FIG. 1A, and by reference number 120, the backend device may send the determined experience code to the IVR device. As shown by reference number 125, the IVR device may configure the IVR call tree based on the experience code received from the backend device. After configuring the IVR call tree (e.g., by adding a call tree option based on the experience code), the IVR device may send (as shown by reference number 130), to the user device, call tree options that include call tree options based on the experience code. As shown by reference number 135, the user device may present, to the user, the call tree options that are based on the experience code.

As shown in FIG. 1B, and by reference number 140, assume that the user has selected a call tree option to receive an experience based on an experience code. Further assume that the user device has sent a message, to the IVR device, indicating selection of a call tree option to receive an experience based on an experience code. The selected experience may be to have a browser on the user device open a web page, receive a link to a web page, have the user device open an application on the user device, have the user device obtain and launch an application on the user device, receive a link to a software distribution platform for the user device to obtain an application, receive a link to an intermediate web page that will result in a redirect to a software distribution platform for the user device to obtain an application, or the like.

Based on the user device having selected a call tree option to receive an experience based on an experience code, and as shown by reference number 145, the IVR device may send, to the backend device, a request to provide the experience based on the experience code. Based on receiving the request to provide the experience based on the experience code, and as shown by reference number 150, the backend device may send, to the user device, a message to cause the user device to provide the experience based on the experience code.

As further shown in FIG. 1B, and based on the user device receiving the message to cause the user device to provide the experience based on the experience code, the user device may provide the experience to the user (as shown by reference number 155). For example, as shown by reference number 160, the user device may provide the experience by accessing content (e.g., opening a web page) based on the message. In some implementations, the user device may provide the experience by launching an application (e.g., a mobile app) based on the message (as shown by reference number 165). In some implementations, the user device may provide the experience by obtaining an application based on the message (as shown by reference number 170) and then launching the application (as shown by reference number 165).

In this way, implementations described herein may enable dynamically configuring IVR call trees (e.g., by adding options to open a web page, use an application, or the like) based on the capabilities of a user device that called an IVR system (e.g., an IVR device). Dynamically configuring IVR call trees based on the capabilities of the user device that called the IVR system may provide additional options to callers, including enabling callers to obtain services through a self-service web channel. Enabling callers to obtain services through a self-service web channel may reduce resources consumed to operate a calling center by diverting traffic away from the calling center and to interactive web sessions. Enabling callers to obtain services through a self-service web channel may additionally avoid delays caused by callers having to wait to speak to with a representative.

Dynamically configuring IVR call trees based on the capabilities of the user device that called the IVR system may additionally reduce the number of experiences being presented to callers and/or may avoid offering experiences that may be incompatible with a user device. Reducing the number of presented experiences may reduce call durations for calls to an IVR system, which may reduce network resources consumed supporting calls to the IVR system. Avoiding offering experiences that may be incompatible with a user device, may reduce power, processing, and/or network resources consumed by the user device while attempting to receive experiences that the user device might not support.

As indicated above, FIGS. 1A and 1B are provided merely as an example. Other examples are possible and may differ from what was described with regard to FIGS. 1A and 1B.

Figure 2:
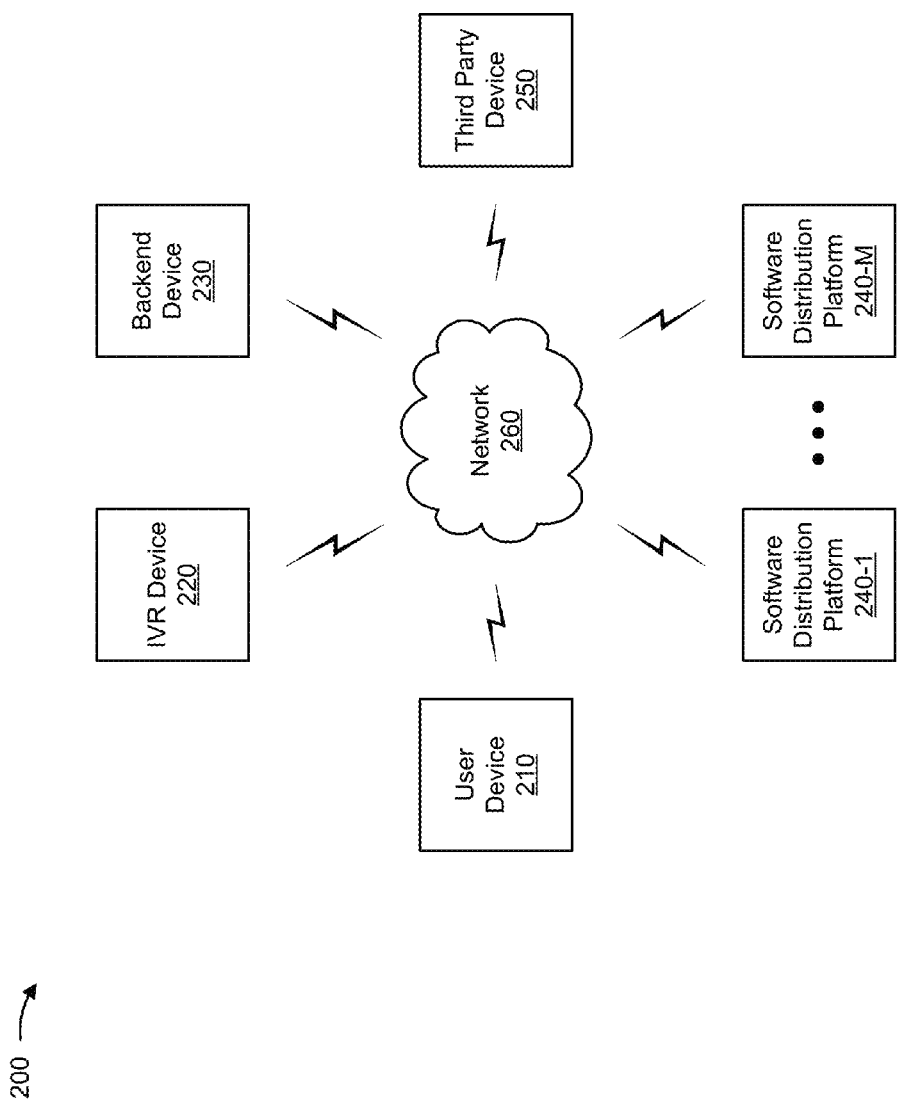
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an interactive voice response (IVR) device 220, a backend device 230, one or more software distribution platforms 240-1 through 240-M (M≥1) (hereinafter referred to collectively as "software distribution platforms 240," and individually as "software distribution platform 240"), a third party device 250, and a network 260. Devices of environment 200 may interconnect via wired connections, wireless connections, or a combination of wired and wireless connections.

User device 210 includes one or more devices capable of communicating with one or more other devices included in environment 200 (e.g., via network 260). For example, user device 210 may include a wired communication device, a plain old telephone service (POTS) telephone, a voice over Internet protocol (VoIP) telephone, a wireless communication device, a radiotelephone, a personal communications system (PCS) terminal (e.g., that may combine a cellular radiotelephone with data processing and data communications capabilities), a smart phone, a desktop computer, a laptop computer, a tablet computer, a personal gaming system, a wearable communication device (e.g., a pair of smart eyeglasses or a smart watch), and/or a similar device. User device 210 may send traffic to and/or receive traffic from network 260 (e.g., via a suitable wireless access point or a base station associated with a cellular network, such as an evolved Node B (eNB) associated with a long-term evolution (LTE) network). In some implementations, user device 210 may include and/or receive suitable software (e.g., a library, an application programming interface (API), or a software development kit (SDK)) to support interactions between user device 210 and backend device 230.

IVR device 220 includes one or more devices capable of providing an IVR system. An IVR system may interpret a human caller's response to voice prompts through use of speech recognition and/or dual-tone multi-frequency (DTMF) decoding of tones input via a telephone keypad (e.g., on user device 210). For example, an IVR system may allow a caller to service the caller's inquiries by following and responding to a dialogue provided by the IVR system. In some implementations, the dialogue may be based on an IVR call tree. In some implementations, IVR device 220 may be capable of configuring the IVR call tree based on an experience code received from backend device 230, as described in more detail elsewhere herein. In some implementations, an entity may operate IVR device 220 on behalf of a third party (e.g., a third party associated with third party device 250).

Backend device 230 includes one or more devices, such as one or more server devices, capable of communicating with user device 210, IVR device 220, software distribution platform 240, and/or third party device 250, such as via network 260. In some implementations, backend device 230 may be capable of processing and/or storing information received, directly or indirectly, from one or more of user device 210, IVR device 220, software distribution platform 240, and/or third party device 250. In some implementations, backend device 230 may be an application server associated with an application (e.g., a mobile app) on user device 210. For example, backend device 230 may provide a mobile back-end that may support access to an enterprise system associated with an application on user device 210. In some implementations, a single entity may operate backend device 230 and IVR device 220. In some implementations, separate entities may operate backend device 230 and IVR device 220.

Software distribution platform 240 includes one or more devices, such as one or more server devices, capable of providing applications to user device 210. As used herein, an application may be a computer program (e.g., a mobile app) that is designed to run on a user device (e.g., user device 210). In some implementations, software distribution platform 240 may be a digital distribution platform that provides applications for a particular mobile device operating system (e.g., an app store or app marketplace, such as Google Play, operated by Google to support the Android OS, the Amazon Appstore, operated by Amazon.com to support the Android OS, the App Store, operated by Apple Inc. to support the iPhone OS (iOS), or the Windows Store, operated by Microsoft to support Windows-powered devices).

Third party device 250 includes one or more devices, such as one or more server devices (e.g., a content server, a host server, a web server, an application server, a database server, a voice portal server, a payment processing server, a credit card processing server, or the like). The one or more server devices of third party device 250 may be capable of receiving, generating, storing, processing, and/or providing information associated with a third party service and/or third party content (e.g., an application supported by third party device 250). In some implementations, third party device 250 may be capable of communicating with user device 210 and/or backend device 230, such as via network 260. In some implementations, a single entity may operate third party device 250 and IVR device 220. In some implementations, separate entities may operate third party device 250 and IVR device 220. In some implementations, an entity may operate third party device 250 on behalf of a third party associated with third party device 250.

Network 260 includes one or more wired and/or wireless networks. For example, network 260 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
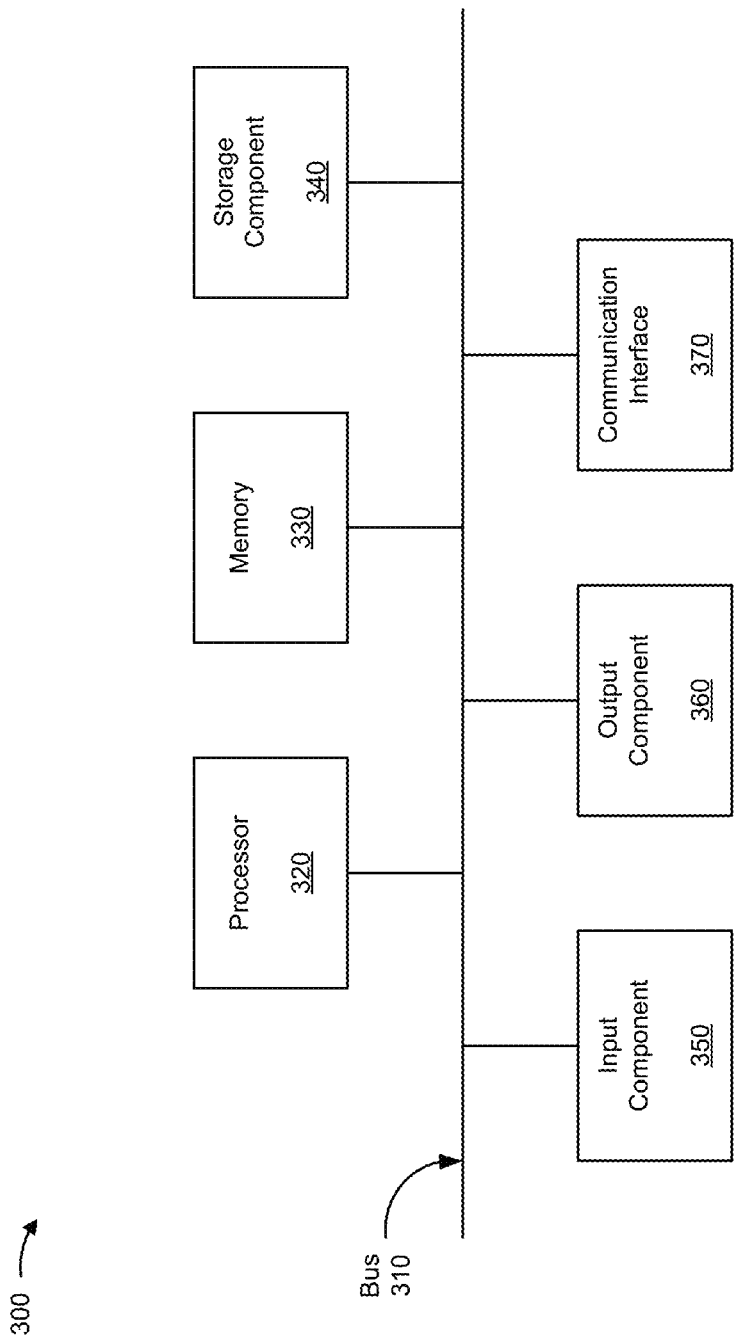
FIG. 3 is a diagram of example components of one or more devices of FIG. 2.

FIG. 3 is a diagram of example components of a device 300. Device 300 may correspond to user device 210, IVR device 220, backend device 230, software distribution platform 240, and/or third party device 250. In some implementations, user device 210, IVR device 220, backend device 230, software distribution platform 240, and/or third party device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for dynamically configuring IVR call trees. In some implementations, one or more process blocks of FIG. 4 may be performed by backend device 230. In some implementations, one or more process blocks of FIG. 4 may be performed by another device or a group of devices separate from or including backend device 230, such as user device 210, IVR device 220, software distribution platform 240, and/or third party device 250.

As shown in FIG. 4, process 400 may include receiving, from an IVR device and based on the IVR device having received a call from a user device, a request for an experience code (block 410). For example, backend device 230 may receive, from IVR device 220, a request for an experience code.

In some implementations, backend device 230 may receive the request for the experience code based on IVR device 220 having received a call (e.g., a voice call) from user device 210. For example, a user may have used user device 210 to call a phone number (e.g., a toll-free customer-service number or the like) that is hosted by IVR device 220. Based on receiving the call, IVR device 220 may send, to backend device 230, a request for the experience code. The request for the experience code may include a user device identifier for user device 210, a client identifier associated with IVR device 220, and/or a requested experience type (e.g., a web-based experience, an application-based experience, or the like) for an experience to be provided to user device 210.

The user device identifier for user device 210 may be a phone number, a mobile device number (MDN), an international mobile subscriber identity (IMSI), a temporary mobile subscriber identity (TMSI), or the like. In some implementations, IVR device 220 may implicitly obtain a user device identifier for user device 210 (e.g., via caller ID). In some implementations, IVR device 220 may obtain the user device identifier explicitly from user device 210 (e.g., where user device 210 provides the user device identifier to IVR device 220).

The client identifier associated with IVR device 220 may be a suitable character string that may identify an entity that is associated with the IVR device 220. For example, the client identifier may identify an entity that is associated with the phone number that is hosted by IVR device 220 (e.g., the entity that user device 210 called). In some implementations, IVR device 220 may have received the client identifier from backend device 230. For example, IVR device 220 may have received the client identifier in connection with a registration process where the entity associated with IVR device 220 registered to receive services from backend device 230.

As will be discussed in more detail below, the experience code may be a suitable character string that may be used to identify an experience (e.g., a call tree experience, a web-based experience, an application-based experience, or the like) that IVR device 220 may offer (e.g., in a call tree) and/or that backend device 230 may cause user device 210 to provide (e.g., to a user of user device 210). A call tree experience may include a static IVR call tree, which may include a tree of menus and/or options (e.g., to select and hear prerecorded information, connect to a human representative, or the like) that are presented to a user during a call to the IVR device. A web-based experience may include having a browser on the user device open a web page, receiving a link to a web page for the user device to open the web page, or the like. An application-based experience may include having the user device launch an application on the user device; having the user device obtain, install, and launch an application on the user device; receiving a link to a software distribution platform for the user device to obtain an application; receiving a link to an intermediate web page that will result in a redirect to a software distribution platform for the user device to obtain an application; or the like.

In some implementations, the request for the experience code may additionally include an access token. Backend device 230 may use the access token included in the request for the experience code to determine whether IVR device 220 and/or user device 210 are authorized to receive services from backend device 230 (e.g., in connection with user device 210's call to IVR device 220). In some implementations, backend device 230 may determine that IVR device 220 and user device 210 are authorized to receive services from backend device 230 (e.g., in connection with user device 210's call to IVR device 220) based on the access token being included in the request for the experience code.

In some implementations, IVR device 220 may obtain the access token from backend device 230. For example, prior to sending the request for the experience code, IVR device 220 may send an authorization request to backend device 230. In some implementations, IVR device 220 may send the authorization request based on IVR device 220 having received the call from user device 210.

The authorization request may include the user device identifier, the client identifier, and a client secret (e.g., a password or secret key) associated with IVR device 220. In some implementations, IVR device 220 may have received the client identifier and the client secret from backend device 230 in connection with a registration process. For example, IVR device 220, or an entity associated with IVR device 220, may have previously registered (e.g., with backend device 230) to receive services from backend device 230.

In some implementations, backend device 230 may send the access token to IVR device 220 based on backend device 230 having determined that IVR device 220 and user device 210 are authorized to receive services from backend device 230 (e.g., in connection with user device 210's call to IVR device 220). For example, backend device 230 may determine that IVR device 220 is authorized to receive services and/or to receive an experience code from backend device 230 based on the client identifier and the client secret, included in the authorization request, matching a client identifier and a client secret that backend device 230 provided, to IVR device 220, when IVR device 220 registered with backend device 230. Backend device 230 may determine that user device 210 is authorized to receive services from backend device 230 (e.g., in connection with user device 210's call to IVR device 220) based on the user device identifier being included in the authorization request.

As further shown in FIG. 4, process 400 may include determining, based on the request, user device information and/or service information (block 420). For example, backend device 230 may determine user device information and/or service information based on the request, for the experience code, that backend device 230 received from IVR device 220.

The user device information may include information associated with user device 210. For example, the user device information may include a device type (e.g., a landline phone (e.g., a POTS telephone) or a mobile device (e.g., a cellular phone, a smart phone, or the like)) for user device 210, a carrier (e.g., a network operator) associated with user device 210, an OS (e.g., the Android OS, the iPhone OS (iOS), or the Windows OS) being used by user device 210, information regarding applications (e.g., mobile apps) on user device 210, information regarding software on user device 210, or the like.

In some implementations, backend device 230 may determine user device information based on the request for the experience code. For example, backend device 230 may determine items of user device information based on user device 210's user device identifier (e.g., as included in the request for the experience code).

In some implementations, backend device 230 may determine a device type for user device 210 and/or a carrier associated with user device 210 based on user device 210's user device identifier. For example, backend device 230 may determine the device type and/or the carrier based on a lookup, of user device 210's user device identifier, in an appropriate data structure (e.g., a home location register (HLR) query, a number portability database query, a signaling system 7 (SS7) query, or the like).

In some implementations, backend device 230 may determine the OS being used by user device 210 based on user device 210's user device identifier (e.g., from the request for the experience code). For example, if backend device 230 and user device 210 are both associated with the same carrier, backend device 230 may determine a device model for user device 210 based on a lookup of user device 210's user device identifier in the carrier's records. Backend device 230 may then determine user device 210's OS based on the OS that is associated with the device model for user device 210. In some implementations, when backend device 230 and user device 210 are both associated with the same carrier, backend device 230 may directly determine user device 210's OS based on a lookup of user device 210's user device identifier in the carrier's records.

In some implementations, backend device 230 may determine whether user device 210 includes an application based on user device 210's user device identifier. For example, after user device 210 obtained the application, software on user device 210, that is associated with the application and/or backend device 230 (e.g., a library, an API, or an SDK), may cause user device 210 to register user device 210's user device identifier with backend device 230.

In some implementations, backend device 230 may determine whether user device 210 includes software to assist with delivering content to user device 210. For example, backend device 230 may determine that user device 210 includes such software based on the software having caused user device 210 to register with backend device 230. Alternatively, if backend device 230 and user device 210 are both associated with the same carrier, backend device 230 may determine that user device 210 includes such software based on information in the carrier's records. In some implementations, software to assist with delivering content to user device 210 may enable backend device 230 to cause a browser on user device 210 to open a web page. In some implementations, software to assist with delivering content to user device 210 may enable backend device 230 to push an application to user device 210 and cause the application to launch on user device 210.

The service information may include campaign information and available experience type information for experience campaigns that are supported by backend device 230. In some implementations, experience campaigns that are supported by backend device 230 may be sponsored by a third party (e.g., a third party associated with IVR device 220 and/or third party device 250). In some implementations, experience campaigns that are supported by backend device 230 may be sponsored by an entity associated with backend device 230 (e.g., a carrier, network operator, or the like).

In some implementations, backend device 230 may determine service information based on the request for the experience code. For example, backend device 230 may determine campaign information and/or available experience type information based on the client identifier included in the request for the experience code.

In some implementations, the campaign information may include information regarding the status of experience campaigns that are associated with the client identifier. For example, the campaign information may include information regarding whether there are any campaigns associated with the client identifier, whether any of the campaigns are active (e.g., campaigns that have started and have not yet ended), whether a campaign has sufficient budget (e.g., a sufficient number of available usages) to provide a requested experience, or the like.

In some implementations, the available experience type information may include information regarding experience types that are available in connection with the client identifier. For example, the available experience type information may include information regarding whether a web-based experience, an application-based experience, or both are associated with the client identifier. In some implementations, a web-based experience may be available when a web page is hosted by third party device 250. In some implementations, an application-based experience may be available when an application, associated with IVR device 220 and/or third party device 250, is available.

As further shown in FIG. 4, process 400 may include determining the experience code based on the request, the user device information, and/or the service information (block 430). For example, backend device 230 may determine an experience code for use during user device 210's call to IVR device 220. In some implementations, the experience code may be a suitable character string that may be used to identify, to IVR device 220, a particular experience that IVR device 220 may offer (e.g., in a call tree) and/or backend device 230 may cause user device 210 to provide (e.g., to a user of user device 210).

In some implementations, backend device 230 may determine the experience code based on the request, the user device information, and/or the service information. For example, backend device 230 may determine the experience code based on the requested experience type (e.g., web-based or application-based) from the request, user device 210's device type, user device 210's OS, information regarding applications and/or software on user device 210, campaign information, and/or available experience type information. Determining experience codes based on the request, the user device information, and/or the service information may reduce the number of experience codes to be presented to a user of user device 210 and/or may avoid offering experiences that may be incompatible with user device 210. Reducing the number of presented experience codes may reduce call duration for user device 210's call to IVR device 220, which may reduce network resources consumed supporting calls to IVR device 220. Avoiding offering experiences that may be incompatible with user device 210, may reduce power, processing, and/or network resources consumed by user device 210 attempting to receive experiences that user device 210 might not support.

In some implementations, backend device 230 may determine an experience code that corresponds to the call tree experience when the device type indicates that user device 210 has no Internet access (e.g., user device 210 is a POTS telephone), the device type for user device 210 is unknown, and/or the campaign information indicates that there is either no active campaign or insufficient budget for a campaign. In some implementations, backend device 230 may alternatively determine an experience code that corresponds to the call tree experience when the available experience type information does not include the requested experience type (e.g., only a web-based experience is available, but an application-based experience was requested, or the reverse). In some implementations, backend device 230 may alternatively determine an experience code that corresponds to the call tree experience when the requested experience type is an application-based experience, but no application associated with IVR device 220 is available for user device 210's OS and/or user device 210's OS is not supported by IVR device 220.

In some implementations, backend device 230 may determine an experience code that corresponds to an open-web-page experience (e.g., a web-based experience) when the device type indicates that user device 210 has Internet access (e.g., user device 210 is a mobile device such as a smart phone), the campaign information indicates that there is an active campaign with sufficient budget, the requested experience type is a web-based experience, the available experience type information indicates that a web-based experience is available, and/or the user device information indicates that user device 210 includes software to enable backend device 230 to cause a browser on user device 210 to open a web page.

In some implementations, backend device 230 may determine an experience code that corresponds to a link-to-web-page experience (e.g., a web-based experience) when the device type indicates that user device 210 has Internet access (e.g., user device 210 is a mobile device, such as a smart phone), the campaign information indicates that there is an active campaign with sufficient budget, the requested experience type is a web-based experience, and/or the available experience type information indicates that a web-based experience is available. In some implementations, backend device 230 may determine an experience code that corresponds to the link-to-web-page experience when the user device information additionally indicates that user device 210 does not include software to enable backend device 230 to cause a browser on user device 210 to open a web page.

In some implementations, backend device 230 may determine an experience code that corresponds to a launch-application experience (e.g., an application-based experience) when the device type indicates that user device 210 has Internet access (e.g., user device 210 is a mobile device such as a smart phone), the campaign information indicates that there is an active campaign with sufficient budget, the requested experience type is an application-based experience, the available experience type information indicates that an application-based experience is available, and/or the user device information indicates that user device 210 includes an application associated with IVR device 220 (e.g., that the application is installed on user device 210).

In some implementations, backend device 230 may determine an experience code that corresponds to an obtain-and-launch-application experience (e.g., an application-based experience) when the device type indicates that user device 210 has Internet access (e.g., user device 210 is a mobile device such as a smart phone), the campaign information indicates that there is an active campaign with sufficient budget, the requested experience type is an application-based experience, the available experience type information indicates that an application-based experience is available, the user device information indicates that user device 210 does not include an application associated with IVR device 220, and/or the user device information indicates that user device 210 includes software to enable backend device 230 to push an application to user device 210 and cause the application to launch on user device 210.

In some implementations, backend device 230 may determine an experience code that corresponds to a link-to-obtain-application experience (e.g., an application-based experience) when the device type indicates that user device 210 has Internet access (e.g., user device 210 is a mobile device such as a smart phone), the campaign information indicates that there is an active campaign with sufficient budget, the requested experience type is an application-based experience, the available experience type information indicates that an application-based experience is available, and/or the user device information indicates that user device 210 does not include an application associated with IVR device 220. In some implementations, backend device 230 may determine an experience code that corresponds to the link-to-obtain-application experience when the user device information additionally includes an identity of user device 210's OS. In some implementations, backend device 230 may determine an experience code that corresponds to the link-to-obtain-application experience when the user device information additionally indicates that user device 210 does not include software to enable backend device 230 to push a new application to user device 210.

In some implementations, backend device 230 may determine an experience code that corresponds to an obtain-application-for-unknown-OS experience (e.g., an application-based experience) when the device type indicates that user device 210 has Internet access (e.g., user device 210 is a mobile device such as a smart phone), the campaign information indicates that there is an active campaign with sufficient budget, the requested experience type is an application-based experience, the available experience type information indicates that an application-based experience is available, the user device information indicates that user device 210 does not include an application associated with IVR device 220, and/or the user device information does not include any information regarding user device 210's OS.

In some implementations, backend device 230 may determine multiple experience codes that correspond to multiple different experiences. For example, when the requested experience type from the request, user device 210's device type, user device 210's OS, information regarding applications and/or software on user device 210, campaign information, and/or available experience type information support multiple experiences, backend device 230 may determine multiple experience codes corresponding to the multiple supported experiences.

As further shown in FIG. 4, process 400 may include sending, to the IVR device, the experience code to enable the IVR device to configure a call tree based on the experience code (block 440). For example, backend device 230 may send the experience code to IVR device 220. In some implementations, backend device 230 may send multiple experience codes to IVR device 220.

In some implementations, receiving the experience code, from backend device 230, may enable IVR device 220 to configure a call tree based on the experience code. For example, IVR device 220 may configure a call tree, for use during user device 210's call to IVR device 220, by adding an option to the call tree for the user to receive an experience based on an experience code that backend device 230 sent to IVR device 220. In some implementations, IVR device 220 may configure the call tree by replacing at least one existing option with an option for the user to receive an experience based on an experience code that backend device 230 sent to IVR device 220. Thus, in addition to typical static call tree options (e.g., receiving a recorded message, speaking to an operator, or the like), a user may select an option to receive an experience based on an experience code (e.g., to access a web page and/or to use an application).

In some implementations, configuring the call tree based on the experience code may retain the existing call tree. For example, when the experience code corresponds to the call tree experience, IVR device 220 may retain an existing static call tree (e.g., without removing, changing, and/or adding options). In some implementations, where the experience code corresponds to the call tree experience, IVR device 220 may alter an existing static call tree (e.g., by removing, changing, and/or adding options), to form a dynamic call tree, based on receiving the experience code.

As further shown in FIG. 4, process 400 may include receiving, from the IVR device, a request for an experience based on the experience code (block 450). For example, backend device 230 may receive, from IVR device 220, a request that an experience based on the experience code be provided to user device 210 and/or to a user of user device 210.

In some implementations, user device 210, or a user operating user device 210, may have selected an option from the call tree, presented by IVR device 220, to receive an experience based on an experience code. For example, while the user is using user device 210 to interact with IVR device 220, IVR device 220 may, for example, suggest that user device 210 receive an experience based on the experience code (e.g., access a web page or use an application as a way for the user to obtain services). Based on user device 210 having selected (e.g., based on appropriate input from a user) the option to receive an experience based on the experience code, IVR device 220 may send, to backend device 230, a request to provide an experience based on the experience code.

As further shown in FIG. 4, process 400 may include sending, to the user device, a message to cause the user device to provide the experience based on the experience code (block 460). For example, backend device 230 may send, to user device 210, a message to cause user device 210 to provide the experience based on the experience code. In some implementations, backend device 230 may send the message to user device 210 based on backend device 230 having received, from IVR device 220, a request to provide an experience based on the experience code.

In some implementations, when the experience code corresponds to the open-web-page experience, backend device 230 may send, to user device 210, a message to cause user device 210 to open a web page (e.g., a web page hosted by third party device 250). For example, backend device 230 may send a message to cause software on user device 210 to cause a browser on user device 210 to open a web page. The software on user device 210 may be the software to enable backend device 230 to cause a browser on user device 210 to open a web page.

In some implementations, when the experience code corresponds to the link-to-web-page experience, backend device 230 may send, to user device 210, a message (e.g., a short message service (SMS) message) that includes a link (e.g., a uniform resource locator (URL)) to a web page (e.g., a web page hosted by third party device 250). In some implementations, user device 210 may display the link to a user, and user device 210 may open the web page (e.g., based on the user selecting the link).

In some implementations, when the experience code corresponds to the launch-application experience, backend device 230 may send, to user device 210, a message to cause user device 210 to launch an application (e.g., a previously installed application) on user device 210. In some implementations, the message may cause user device 210 to launch the application to a specific location and/or to specific content within the application. For example, the message may include a uniform resource identifier (URI) (e.g., a URL) that links to a specific location within the application rather than simply launching the application. In some implementations, the URI may include the information needed to launch the application directly into a particular location (e.g., a particular page within a particular application). Launching the application to a specific location and/or to specific content within the application may reduce resources (e.g., processing and power) that might otherwise be consumed by user device 210 while navigating through the application to the specific location and/or the specific content.

In some implementations, when the experience code corresponds to the obtain-and-launch-application experience, backend device 230 may send, to user device 210, a message to enable backend device 230 to push an application to user device 210 and cause the application to launch on user device 210. For example, backend device 230 may send a message to cause software on user device 210 to cause user device 210 to obtain and launch the application. The software on user device 210 may be the software to enable backend device 230 to push an application to user device 210 and cause the application to launch on user device 210. In some implementations, the message may cause user device 210 to launch the application to a specific location and/or to specific content within the application. In some implementations, the message may cause the application to be installed on user device 210 prior to launching.

In some implementations, when the experience code corresponds to the link-to-obtain-application experience, backend device 230 may send, to user device 210, a message (e.g., an SMS message) that includes a link (e.g., a URL) to software distribution platform 240, from where, user device 210 may obtain the application. In some implementations, the link may be to a software distribution platform that provides applications compatible with user device 210's OS (e.g., the Android OS, the iPhone OS (iOS), or the Windows OS, as determined by backend device 230). After obtaining the application, user device 210 may launch the application (e.g., based input from a user of user device 210).

In some implementations, when the experience code corresponds to the obtain-application-for-unknown-OS experience, backend device 230 may send, to user device 210, a message (e.g., an SMS message) that includes a link (e.g., a URL) to an intermediate web page that is hosted by backend device 230 (e.g., for the purpose of determining an OS being used by user device 210). When backend device 230 receives, from user device 210, a request for the intermediate web page, backend device 230 may determine an OS (e.g., the Android OS, the iPhone OS (iOS), or the Windows OS) being used by user device 210 based on the request, received from user device 210, for the intermediate web page. For example, backend device 230 may determine user device 210's OS based on a header portion (e.g., the hypertext transfer protocol (HTTP) header field "User-Agent") of the request for the intermediate web page.

After determining user device 210's OS, backend device 230 may send, to user device 210, a redirect message (e.g., an HTTP 302 redirect), which redirects user device 210 to software distribution platform 240, from where, user device 210 may obtain the application. In some implementations, the redirect may be to a software distribution platform that provides applications compatible with user device 210's OS (e.g., the Android OS, the iPhone OS (iOS), or the Windows OS, as determined by backend device 230). In some implementations, the redirect may cause user device 210 to obtain the application from software distribution platform 240. For example, based on receiving the redirect from backend device 230, user device 210 may send a request, to software distribution platform 240, to obtain the application. In some implementations, user device 210 may send the request, to software distribution platform 240, to obtain the application based on input from a user of user device 210. After obtaining the application, user device 210 may launch the application (e.g., based on input from a user of user device 210).

Based on the experience provided, by user device 210, to a user of user device 210 (e.g., opening a web page and/or launching an application on user device 210), the user (e.g., a caller) may obtain information and/or services responsive to a reason that prompted the user to call the phone number hosted by IVR device 220. For example, the web page and/or the application may provide a self-service portal, through which the user may obtain information and/or services (e.g., support services, payment processing services, or the like).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, implementations described herein may enable dynamically configuring IVR call trees (e.g., by adding options to open a web page, use an application, or the like) based on the capabilities of a user device that called an IVR system (e.g., an IVR device). Dynamically configuring IVR call trees based on user device capabilities may provide additional options to callers, including enabling callers to obtain information and/or services through a self-service web page and/or via an application (e.g., a mobile app). Enabling callers to obtain information and/or services through a self-service web page and/or via an application may reduce resources consumed to operate a calling center by diverting traffic away from the calling center. Enabling callers to obtain information and/or services through a self-service web page and/or via an application may avoid delays caused by callers having to wait to speak to with a representative.

Dynamically configuring IVR call trees based on user device capabilities may additionally reduce the number of experiences being presented to callers and/or may avoid offering experiences that may be incompatible with a user device. Reducing the number of presented experiences may reduce call durations for calls to IVR systems, which may reduce network resources consumed supporting calls to IVR systems. Avoiding offering experiences, that may be incompatible with a user device, may reduce power, processing, and/or network resources consumed by the user device while attempting to receive experiences that the user device might not support.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from an interactive voice response (IVR) device, a first request for a code,
the first request being based on the IVR device having received a call from a user device;
determine user device information, associated with the user device, based on the first request;
determine the code based on at least one of the first request or the user device information;
send, to the IVR device, the code to enable the IVR device to configure a call tree based on the code;
receive, from the IVR device, a second request for an experience,
the experience to be based on the code; and
send, to the user device, a message to cause the user device to provide the experience.

2. The device of claim 1,
where the message includes a link to at least one of a web page or a software distribution platform from which an application may be obtained.

3. The device of claim 1,
where the message is to cause the user device to launch an application.

4. The device of claim 1,
where the one or more processors are further to:
determine, before determining the code, an available experience type; and
where the one or more processors, when determining the code, are to:
determine the code based on at least one of the first request, the user device information, or the available experience type.

5. The device of claim 1,
where the one or more processors, when determining the user device information based on the first request, are to:

determine, based on the first request, an operating system (OS) used by the user device; and
where the one or more processors, when determining the code based on at least one of the first request or the user device information, are to:
determine the code based on the OS used by the user device.

6. The device of claim 1,
where the message includes a link to a web page hosted by the device; and
where the one or more processors are further to:
receive, from the user device and after sending the message, a third request for the web page;
determine, based on the third request, an operating system (OS) used by the user device; and
send, to the user device, a redirect to a software distribution platform,
the redirect to the software distribution platform being based on the OS.

7. The device of claim 1, where the one or more processors are further to:
receive, from the IVR device and prior to receiving the first request for the code, an authorization request;
determine, prior to receiving the first request for the code and based on the authorization request, whether the IVR device is authorized to receive services from the device;
generate an access token based on determining that the IVR device is authorized to receive the services from the device;
send the access token to the IVR device prior to receiving the first request for the code; and
where the first request for the code includes the access token.

8. A non-transitory computer-readable medium storing instructions, the instructions comprising:
one or more instructions that, when executed by one or more processors, cause the one or more processors to:
receive, from an interactive voice response (IVR) device, a first request for a code,
the first request being based on the IVR device having received a call from a user device;
determine information associated with the user device,
the information associated with the user device being determined based on the first request;
determine the code based on at least one of the first request or the information associated with the user device;
send, to the IVR device, the code to enable the IVR device to offer an option in a call tree,
the option being based on the code;
receive, from the IVR device, a second request for an experience,
the experience to be based on the option; and
send, to the user device, a message to cause the user device to provide the experience.

9. The non-transitory computer-readable medium of claim 8,
where the message to cause the user device to provide the experience is to cause the user device to open a web page.

10. The non-transitory computer-readable medium of claim 8,
where the message to cause the user device to provide the experience is to cause the user device to obtain and launch an application.

11. The non-transitory computer-readable medium of claim 8,
receive, from the IVR device and prior to receiving the first request for the code, an authorization request;
determine, prior to receiving the first request for the code and based on the authorization request, whether the IVR device is authorized to receive the code;
determine an access token based on determining that the IVR device is authorized to receive the code;
send the access token to the IVR device prior to receiving the first request for the code; and
where the first request for the code includes the access token.

12. The non-transitory computer-readable medium of claim 8,
where the one or more instructions, when executed by the one or more processors, further cause the one or more processors to:
determine, before determining the code, campaign information for the IVR device; and
where the one or more instructions, that cause the one or more processors to determine the code, cause the one or more processors to:
determine the code based on at least one of the first request, the information associated with the user device, or the campaign information.

13. The non-transitory computer-readable medium of claim 8,
where the one or more instructions, when executed by the one or more processors, further cause the one or more processors to:
determine, before determining the code, an available experience type; and
where the one or more instructions, that cause the one or more processors to determine the code, cause the one or more processors to:
determine the code based on at least one of the first request, the information associated with the user device, or the available experience type.

14. The non-transitory computer-readable medium of claim 8,
where the one or more instructions, that cause the one or more processors to determine information associated with the user device, cause the one or more processors to:
determine, based on the first request and before determining the code, an operating system (OS) used by the user device; and
where the one or more instructions, that cause the one or more processors to determine the code, cause the one or more processors to:
determine the code based on the OS used by the user device.

15. A method, comprising:
receiving, by a device and from an interactive voice response (IVR) device, a first request for a code,
the first request being based on the IVR device having received a call from a user device;
determining, by the device, user device information associated with the user device,
the user device information being determined based on the first request;
determining, by the device, the code,
the code being determined based on at least one of the first request or the user device information, and
the code corresponding to an experience;

sending, by the device, the code to the IVR device to enable the IVR device to configure a call tree to offer the experience;

receiving, by the device and from the IVR device, a second request for the experience; and sending, by the device and to the user device, a message, the message being to cause the user device to provide the experience.

16. The method of claim 15, where determining the user device information comprises:
  determining, based on the first request, a device type for the user device; and where determining the code comprises:
  determining the code based on the device type.

17. The method of claim 15, where the code is a first code;

where the experience is a first experience; and the method further comprising:
  determining a second code based on the at least one of the first request or the user device information, the second code corresponding to a second experience; and
  sending, to the IVR device, the second code to enable the IVR device to configure the call tree to offer the first experience and the second experience.

18. The method of claim 15, where the message includes a link to at least one of a web page or a software distribution platform from which an application may be obtained by the user device.

19. The method of claim 15, where determining the user device information comprises:
  determining, based on the first request, an operating system (OS) used by the user device; and where determining the code comprises:
  determining the code based on the OS used by the user device.

20. The method of claim 15, where the message is to cause the user device to obtain an application.

\* \* \* \* \*